(No Model.)
P. C. CHOATE.
PRODUCING METALLIC ZINC.
No. 518,711. Patented Apr. 24, 1894.
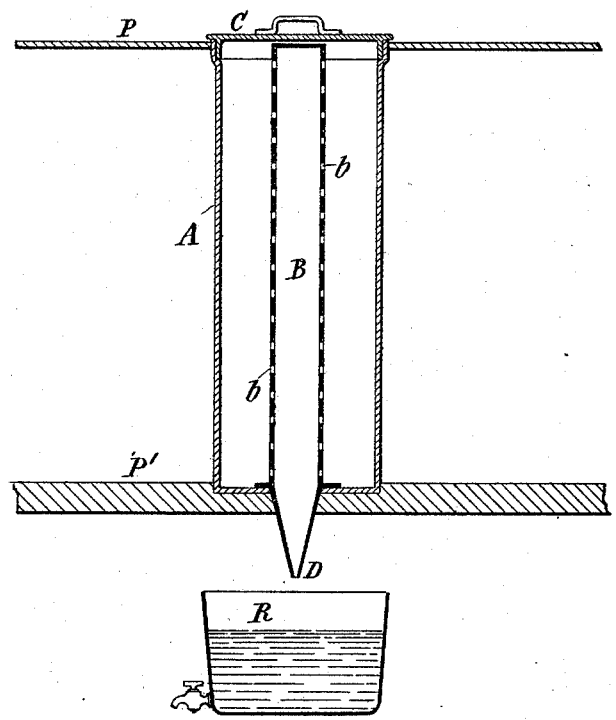
Witnesses:
Raphael Netter
G. P. Wood
Inventor
Parker C. Choate
by
Clarkson A. Collins
Attorney.

UNITED STATES PATENT OFFICE.

PARKER C. CHOATE, OF NEW YORK, N. Y., ASSIGNOR TO THE ELECTRICAL ZINC COMPANY, OF NEW JERSEY.

PRODUCING METALLIC ZINC.

SPECIFICATION forming part of Letters Patent No. 518,711, dated April 24, 1894.

Application filed December 9, 1891. Serial No. 414,468. (No specimens.)

*To all whom it may concern:*

Be it known that I, PARKER C. CHOATE, a citizen of the United States, residing in the city of New York, in the county and State of New York, have invented certain new and useful Improvements in the Art of Producing Metallic Zinc, (Case No. 3,) of which the following is a specification.

My invention relates to the production of metallic zinc from its ores, and the object of my improvement is to provide an economical method of producing commercially pure metallic zinc. While my method is applicable to the production of zinc as a metal from any of its ores, it is more especially valuable as applied to that large class of ores known as "blendous" or "complex," which carries varying percentages of zinc, iron, sulphur, lead, copper, gold and silver with accompanying gangue matter, and also such constituents as cadmium, arsenic, bismuth, antimony, &c., and which on account of the difficulty of working them have heretofore been discarded at the mines in great quantities as waste products. In working such ores for the extraction of metals other than zinc, as heretofore practiced, there has been a total loss of the zinc except when utilized as a pigment, and at the same time its presence causes heavy losses of the other metals such as gold, silver, &c. Although in many cases these ores are very rich in zinc, which is usually the most valuable constituent, all attempts to treat them for the extraction of that metal commercially have failed even at the sacrifice of the other constituents of value. Thus the ordinary method of producing metallic zinc from the ore by distillation is entirely inapplicable to these "complex" ores, since so many other metals are distilled with the zinc and enter as impurities into the metallic product that it is entirely unfit for the commercial uses to which metallic zinc is applied. Even as produced from its purer ores by distillation, zinc of commerce is more or less impure, carrying lead, cadmium, iron, copper, tin, bismuth, &c., or some of these in small quantities. The production of substantially pure metallic copper from its ores by electrolysis is well known, but though it is a matter of common knowledge that zinc can be electro-deposited, I believe that no method has been devised, prior to my improvements by means of which it can be commercially produced by electrolysis in a sufficiently pure state to be fit for use in the arts. This is due to the fact that zinc, unlike copper in this respect, is electro-positive to nearly all the metals which are present with it in the ore and will deposit or precipitate upon itself most of the metals which are electro-negative to it from an acid solution in which they are present. Such metals are antimony, arsenic, bismuth, cadmium, cobalt, copper, gold, lead, nickel, silver, tin, &c., and if in the electro-deposition of zinc any of these be allowed to enter into solution with the zinc, as has heretofore always been the case, they will be deposited with the zinc and appear as impurities in the product. It is evident also that in depositing from a soluble zinc anode if any of them are present in the anode and an electrolyte be used in which they are soluble, they will enter into the solution. Consequently a zinc anode made either direct from an impure ore or composed of ordinary zinc distilled from an impure ore cannot be used to produce a pure electro-deposited zinc. In order therefore to attain the result which I have reached of a commercially pure electro-deposited zinc produced from a soluble zinc anode it is necessary to adopt processes and observe precautions in the preparation of the anode which shall obviate the presence in the anode of all such of these substances as may be soluble in the electrolyte employed.

A pure electro-deposited zinc possesses marked advantages over the ordinary zinc of commerce produced by distillation, being softer and more crystalline in its structure and by reason of these qualities more available for many of the uses to which zinc is applied, entirely apart from the advantages incident to its purity. To the end therefore of producing such a zinc, my invention consists broadly in depositing zinc by electrolysis from a soluble zinc anode so prepared as to be free from all metals which are both soluble in the electrolyte used and capable of being deposited or precipitated by zinc upon itself therefrom. In order to prepare such an anode from an impure "complex" or "blendous" ore of zinc, I separate the zinc from the less readily volatilizable elements of the ore by heating or burning the ore mixed with carbonaceous fuel, so as to volatilize the zinc and leave the non-volatilizable elements of the ore such as copper, gold, iron, silica, &c., behind in the furnace and condense and collect the volatilized product in the shape of fume. Then whenever necessary I subject the collected fume to a moderate roast, so as to expel all its soluble constituents, which are more readily volatilizable than the zinc such as cadmium, arsenic, &c., and finally convert this purified fume into metallic form by distilling it and collecting and casting the distilled product into slabs of suitable size and shape for use as anodes. The zinc contained in the anodes thus prepared is afterward electro-deposited in a pure state by subjecting the anodes to the action of an electric current in an acid electrolyte which is not a solvent of such constituents of the anodes as are depositable by zinc.

In the accompanying drawing is shown a sectional elevation of a form of retort which may be used with advantage in distilling the zinc fume. Any usual or suitable method may be adopted for obtaining the fume to be used in my process. As an example of one well known method, the ore, after being crushed may be mixed with carbonaceous fuel, such as coal screenings, and then be roasted in a furnace, into which air is admitted beneath its grate, at a temperature high enough to volatilize the zinc until the zinc contained in the ore is driven off. The volatilized zinc product, and other volatilized matter may then be condensed and caught and collected in a bag room in the ordinary manner. The resulting product will be in the shape of a fine powder known as "fume" and chemically may be in the form of any of the volatilized compounds of zinc, as produced by the process employed. There will also be contained in the fume much of the lead which was present in the ore, and was volatilized with the zinc. There will also frequently occur with the zinc and lead in the fume the condensed products of other more volatile metals which may have been present in their compounds in the ore such as those of arsenic, antimony, cadmium, &c. These substances are among those which are depositable by zinc from an acid electrolyte, but are all volatilizable at a much lower temperature than zinc and lead. Hence when they occur in appreciable quantities, I dispose of them by subjecting the fume to a moderate roast at a temperature of 500° to 800° Fahrenheit in any well known form of muffle furnace, care being taken not to apply sufficient heat to revolatilize any of the zinc contents. By means of this roast the fume is purified of its lighter soluble, volatile constituents, which would otherwise subsequently enter into the anodes, and thence into the solution, and be deposited with and contaminate the zinc. The other metals, excepting silver, which may have been contained in the ore, such as iron, gold, copper, nickel, &c., are not driven off with the zinc and lead, but remain in the furnace in the form of a cinder or slag and may afterward be smelted out and recovered in the usual manner. The greater part of the silver present will also remain in the furnace, but a portion of it may be volatilized and will appear in the fume.

I do not limit myself to the above described method of producing and purifying the zinc fume, it being only necessary for my further operations that I should have a zinc fume from which all impurities of the class indicated, that is, those which would be soluble in the electrolyte to be afterward employed and which would be deposited by zinc upon itself therefrom, have been eliminated.

The next step is the reduction of the purified fume to a metallic form, which may be done in the ordinary well known manner of zinc distillation by heating it, in company with carbon, in a closed retort or muffle, and collecting the reduced and distilled product.

While I do not limit myself to the use of any particular type of distilling furnace, I prefer to use a furnace in which the retorts are placed vertically and to heat such furnace by gas. The distillation of a product of the nature above described will be facilitated by the use of such a type of furnace and gaseous fuel, since a very even heat may be maintained, and the retorts may be charged and recharged without difficulty and without waste of heat.

A suitable form of retort which may be employed is shown in the drawing in which A indicates a cylindrical retort placed vertically in the furnace and having an interior, perforated tube B provided with an opening at the bottom. The retort is charged at the top by removing the cover C. The distilled and melted products pass through the perforations b and down through the tube B, becoming condensed and escaping in molten metallic form at the opening D where they are caught in any suitable receptacle. Where lead is present in considerable quantities a portion of it may be separated from the zinc by allowing it to settle while in the molten state. The remainder of the product of distillation is then run into slabs of suitable shape and size for use as anodes in an electrolytic bath. Besides zinc the anodes will contain of all the original metallic constituents of the ore capable of being deposited by zinc upon itself only lead where lead is present in the ore treated and sometimes also a small percentage of silver. For the purpose of separating the zinc from these metals and producing a pure, soft, crystalline zinc, I now subject the anodes to the action of an electric-current in an electrolyte which is a solvent of the zinc, but in which the lead and silver are insoluble. For this purpose I may use a zinc sulphate bath which may be prepared by dissolving pure sulphate of zinc in water or pure oxide of zinc or metallic zinc in sulphuric acid. If the materials used in preparing the bath are impure, i. e. contain any of those metals hereinbefore shown to be inadmissible in the bath, they should be deposited out before the deposition of pure zinc is begun. In order to render the silver insoluble when present in the anode, I may keep in the bath a trace of chlorine. A small quantity of common salt added to the solution will supply the necessary chlorine of which there needs to be only enough to provide a chemical equivalent for the silver present, which will be thrown down as insoluble chloride of silver.

While iron is not included among those metals which are sufficiently electro-negative to zinc to be depositable upon it from an acid solution, and may therefore be present in the electrolyte in small quantities without injury to the product, I find that it is extremely difficult to prevent traces of it from being carried over when it appears as a constituent part of a soluble anode. It will not however be present in the fume which I employ and can only appear as an accident of manufacture in the course of distillation. Care should therefore be taken in distilling the fume not to allow iron to enter the distilled product by reason of contact with iron tools or from coal ash. The alkaline earths and metals such as aluminium, magnesium, potassium, sodium, &c., will not be deposited with the zinc and their presence, may therefore be disregarded.

Having prepared a suitable bath the slabs or plates of zinc prepared as above described, are suspended therein as anodes and the zinc is deposited upon the cathodes by the application of a current of electricity from any suitable source in the manner usual in electrolysis. The cathodes may be plates of zinc which may afterward be melted with the deposited zinc, or they may be of copper or other suitable metal from which the deposited zinc may be stripped after a suitable thickness has been attained. The zinc will be deposited in a pure state free from any lead or silver present, which being insoluble in the bath will settle therein and may from time to time be removed. The bath while practically neutral will always while working, carry at the anode a small amount of free acid set free by the current on the deposition of the zinc.

In order to prevent stratification of the bath, it should be kept in motion, which may be done in any well-known manner as by pumping the overflow from the bath and returning it thereto, so as to maintain a more or less constant circulation.

I have specified herein the use of an acid solution for the bath, meaning thereby a solution in which the zinc is carried in solution by an acid solvent as distinguished from permanent alkaline solutions. These latter I exclude as commercially and chemically impracticable. Of acid solutions, I prefer to use a sulphate solution as above set forth. I do not however limit my invention thereto but may use any acid in which the metals remaining with the zinc and depositable by zinc upon itself from a solution in which they are present, are insoluble.

The advantages of my invention will be readily apparent, since it affords an easy and economical method of producing metallic zinc of a purity and quality superior to any heretofore known and by its use vast quantities of ore heretofore waste and of no value, can be reduced to their component metals and made valuable.

I do not claim broadly herein the electrolytic deposition of zinc from an anode containing no metal which is both depositable by zinc upon itself from an acid solution in which it is contained and soluble in the electrolyte employed, but have made this the subject of a separate application for Letters Patent filed September 4, 1893, Serial No. 484,699.

What I claim as new, and desire to secure by Letters Patent, is—

1. The hereinbefore described process of producing zinc anodes from an impure ore of zinc, which consists in first separating the zinc from the less volatile constituents of the ore by heating the ore in the presence of a reducing agent in a furnace to which air is admitted, so as to volatilize the zinc and those constituents of the ore more volatile than zinc, and condensing and collecting the volatilized product in the shape of fume; second, reheating the fume to revolatilize and eliminate the metallic constituents more volatile than zinc, and finally subjecting the fume to reduction and distillation and casting the resulting product into anodes of suitable form substantially as and for the purposes set forth.

2. The hereinbefore described process of producing commercially pure metallic zinc which consists in first separating the zinc from the less volatile constituents of the ore by heating the ore in the presence of a reducing agent in a furnace to which air is admitted, so as to volatilize the zinc and those constituents of the ore more volatile than zinc, and condensing and collecting the volatilized product in the shape of fume; second, reheating the fume to revolatilize and eliminate the volatile constituents more volatile than zinc; third, subjecting the fume to reduction and distillation and casting the resulting product into anodes and finally depositing the zinc from the anodes by electrolysis substantially as set forth.

3. The hereinbefore described process of producing commercially pure metallic zinc which consists in reducing and distilling zinc fume freed from its lighter soluble constituents, casting its resulting product into anodes, and separating the zinc from such anodes by means of electrolysis in the presence of an acid electrolyte.

4. The hereinbefore described process of producing commercially pure metallic zinc which consists in immersing in a zinc sulphate electrolyte containing chlorine, a zinc anode so prepared as to contain no metal which is both soluble in such electrolyte and depositable by zinc upon itself therefrom, and depositing the zinc by electrolysis, therefrom substantially as set forth.

In testimony whereof I have hereunto subscribed my name this 7th day of December, A. D. 1891.

PARKER C. CHOATE.

Witnesses:
BENJAMIN BARKER, Jr.,
CLARKSON A. COLLINS.